United States Patent Office 3,647,625
Patented Mar. 7, 1972

3,647,625
METHOD OF REDUCING RAFFINOSE CONTENT OF BEET MOLASSES
Hideo Suzuki, Yoshiko Ozawa, and Osamu Tanabe, Chiba-shi, Japan, assignors to Agency of Industrial Science and Technology, Tokyo, Japan
No Drawing. Filed Mar. 5, 1968, Ser. No. 710,679
Claims priority, application Japan, Apr. 5, 1967, 42/21,629
Int. Cl. C12b 1/00
U.S. Cl. 195—11                                         2 Claims

ABSTRACT OF THE DISCLOSURE

When α-galactosidase is formed in the mycelium of *Mortierella vinacea* var. *raffinoseutilizer* (ATCC No. 20034), it is substantially free from invertase. Mycelial matter taken from this mold and preparation containing the enzyme may thus be added to sugar beet juice or beet molasses for reducing the raffinose content of the same, thereby greatly increasing the recovery of sucrose content.

BACKGROUND OF THE INVENTION

This invention relates to the manufacture of sugar from beets, and particularly to a method of selectively reducing the raffinose content of beet molasses without reducing the sucrose content.

Raffinose is an unavoidable ingredient of sugar beet juice and interferes with the crystallization of sucrose, and thereby limits the amount of sucrose which may be recovered from the juice. It has been normal practice heretofore to ferment the sucrose remaining in the molasses to alcohol, or to use the sucrose-bearing material as animal feed.

If the raffinose is removed from the molasses, the yield of crystalline sucrose can be greatly increased. It is known that α-galactosidase can split raffinose to produce sucrose in a yield of about 66%, but the enzyme available so far is very expensive and contains enough invertase to make it useless in sugar manufacturing unless purified at prohibitive cost.

SUMMARY OF THE INVENTION

We have now found a strain of microorganisms, *Mortierella vinacea* var. *raffinoseutilizer* (ATCC No. 20034), hereinafter referred to as the mold of the invention, in a soil sample from the city of Chiba, Japan, whose mycelium contains α-galacetosidase in high concentrations without significant amounts of accompanying invertase, so that mycelial matter obtained from the mold, when added to beet molasses, sharply reduces the raffinose content of the same, while actually increasing the sucrose content.

The mycelium of the mold of the invention accumulates α-galactosidase, when cultured on a medium containing galactose or oligosaccharide having an α- or β-galactoside bond. When induced by galactose or oligosaccharide having glactoside bond to form the enzyme, the mold can produce further enzyme from a wide variety of inexpensive nutrients, such as rice bran, rape cake, malt culms, malt, corn, corn steep liquor, and the like.

The mold shows the morphological characteristics of *Mortierella vinacea*, as described by Dixon-Steward Manual of Soil Fungi; Gilman, 2nd ed., The Iowa State College Press, Ames, Iowa, U.S.A.).

The characteristics of *Mortierella vinacea* var. *raffinoseutilizer* are as follows:

(1) The microscopic observation of the fruit body grown on a malt extract agar medium shows branched sporangiophores of 3–4$\mu$ diameter, pale-brown sporangia which are almost spherical, 10–20$\mu$ in diameter and devoid of collumella, and irregularly angular sporangiospores of 2.7–5$\mu$.

(2) Macroscopic observation on various agar media

Malt extract agar.—Mycelium shows a thick felt-like appearance and changes in color from white to pale brown or dull orange as the spores mature. No soluble pigment produced in the medium.

Potato-glucose agar.—Mycelium shows change in color from white to light brown as the spores mature. No soluble pigment produced in the medium.

Yeast extract-malt extract agar.—Mycelium shows change in color from white to biege as the spores mature. No soluble pigment produced in the medium.

The following examples are further illustrative of this invention, and it will be understood that the invention is not limited thereto.

EXAMPLE 1

Spores of the mold *Mortierella vinacea* var. *raffinoseutilizer* were inoculated into a medium consisting of a $\frac{1}{10}$ M phosphate buffer (pH 6.0) and the following ingredients:

|  | Percent |
|---|---|
| Carbohydrate, as listed in Table 1 | 0.2 |
| Peptone | 0.3 |
| Meat exract | 0.3 |
| KCl | 0.2 |
| MgSO$_4$·7H$_2$O | 0.2 |

After culturing for 72 hours at 30° C., the mycelium was recovered by filtration, thoroughly washed with water and ground in a mortar with sea sand into a paste, and the ground mycelium was suspended in a volume of distilled water equal to the volume of culture medium from which the mycelium had been separated.

The activity of the enzyme produced by culturing the mold on the carbohydrates listed in the following Table 1 is expressed in units of α-galactosidase activity in the mycelium harvested from 1 ml. of the culture medium.

The activity of the mycelium suspension was measured by adding one milliliter of the same to a mixture of 0.5 ml. of a 0.06 M melibiose solution and 0.5 ml. of a $\frac{1}{10}$ M phosphate buffer (pH 5.2). The mixture was held 2 hours at 40° C., and thereafter for five minutes in a boiling water bath to inactivate the enzyme present, whereupon 1 ml. of a 1.8% solution of Ba(OH)$_2$·8H$_2$O and 1 ml. of a 2% solution of ZnSO$_4$·7H$_2$O were added. The mixture so obtained was centrifuged, and the glucose in the supernatant liquid was determined by the Glucostat method.

The amount of the glucose found and the enzyme concentration are proportional under the conditions chosen up to 1000 $\mu$g. glucose. The enzyme solution is diluted in advance so that the amount of enzyme comes within the above relationship and finally, the amount of liberated glucose is multiplied by a dilution multiple. The activity of α-galactosidase which liberates 1 $\mu$g. of glucose is defined as on unit.

TABLE 1

| Carbohydrate: | Units of α-G |
|---|---|
| Xylose | 0 |
| Arabinose | 0 |
| Rhamnose | 0 |
| Glucose | 0 |
| Mannose | 5 |
| Fructose | 0 |
| Galactose | 1013 |
| Maltose | 4 |
| Cellobiose | 0 |
| Lactose | 3426 |
| Melibiose | 1776 |
| Sucrose | 0 |
| Raffinose | 2250 |
| Soluble starch | 0 |
| Dextran | 0 |

As is clear from the above table, only galactose and the oligosaccharides such as raffinose, melibiose and lactose which contain galactoside bond induce the formation of α-G in the mycelium of the mold of the invention, lactose being most effective.

EXAMPLE 2

A $\frac{1}{10}$ M phosphate buffer (pH 6.0) containing 1.5% lactose, 1% glucose, 0.3% urea, 0.2% magnesium sulfate and 0.2% potassium chloride was prepared as a basic medium to which the materials listed in Table 2 below were added, each in an amount of 3%, to prepare a culture medium which was then inoculated with the mold of the invention and cultured at 30° C. for 72 hours with shaking. The mycelium was then filtered off, washed thoroughly with water, and ground in a mortar with sea sand into a paste. The paste was made into a suspension by adding an amount of distilled water equal to that of the medium, and the suspension was tested for enzyme activity, as described above. Table 2 shows the activity of the α-G in the mycelium harvested from 1 ml. samples of the several media.

TABLE 2

| Raw material: | Units of α-G |
|---|---|
| Wheat bran | 9,453 |
| Fish cake | 9,453 |
| Soybean cake | 70 |
| Rice bran | 32,350 |
| Rape cake | 17,381 |
| Corn | 39,616 |
| Malt | 33,920 |
| Malt culms | 29,984 |
| Spent grains | 365 |
| Corn steep liquor | 25,880 |

EXAMPLE 3

Batches of culture medium were prepared from the basic medium described in Example 2 and the following materials:
(1) Rice bran;
(2) A filtered extract prepared from rice bran and hot water;
(3) The product of a reaction between a filtrate prepared as in (2) above and bacterial α-amylase which was continued until the iodine reaction of the mixture became negative. The mycelium of the mold of the invention grown on the three media in the manner described in Example 2 had α-galactosidase values of 32,191, 34,495, and 38,250 units respectively.

EXAMPLE 4

A $\frac{1}{10}$ M phosphate buffer (pH 6.0) containing 1.5% lactose, 3% rice bran, 0.3% urea, 0.2% magnesium sulphate and 0.2% potassium chloride was used as a basic medium to which 0.2%, 0.5% and 1% malt extract powder were respectively added to prepare culture media. The culturing was carried out in the same manner as described in Example 2, and the activity of the α-G in the mycelium was assayed. An enzyme activity of 27,806 units was found in the mycelium harvested from the basic medium, 29,634 units from the 0.2% malt extract medium, 35,577 units fro mthe 0.5% malt extract medium and 43,349 units from the 1% malt extract medium respectively.

EXAMPLE 5

100 g. lactose, 100 g. glucose, 100 g. corn steep liquor, 100 g. ammonium sulfate, 30 g. $KH_2PO_4$, 30 g.

$MgST_4 \cdot 7H_2O$ 20 g. NaCl, and 100 g. $CaCO_3$ were dissolved in 8 l. water. The resulting solution was placed in a jar fermentor and, after sterilization at 120° C. for 30 minutes, was cooled to 30° C. The solution was then adjusted with sterilized water to a total volume of 10 l. and inoculated with the spores of the mold of the invention, followed by culturing at 30° C. with stirring at 200 r.p.m. and aerating at a rate of 5 l. per minute. The results of tests performed during culturing are listed in Table 4.

TABLE 4

| | pH | Weight of mycelium on dry basis (mg./100 ml. of medium) | Units of α-G |
|---|---|---|---|
| Culturing time (hrs.): | | | |
| 24 | 6.4 | 1.165 | 2,670 |
| 48 | 6.3 | 1.539 | 11,260 |
| 72 | 6.3 | 1.789 | 26,600 |
| 77 | 6.3 | 1.852 | 33,650 |
| 90 | 6.5 | 1.801 | 33,010 |

EXAMPLE 6

A $\frac{1}{10}$ M phosphate buffer containing 0.75% lactose, 2% glucose, 1.8% peptone, 1.8% meat extract, 0.2% magnesium sulfate and 0.2% potassium chloride was inoculated with the mold of the invention, and the mold was cultured with shaking for 72 hours. The mycelium was recovered by filtration, thoroughly washed with water and weighted. The α-G activity was 3,500 units per 1 ml. of the mycelium-free filtrate and 28,400 units in the mycelium harvested from 1 ml. of the medium.

Sulfuric acid was added to 10 g. beet molasses containing 1,088 g. raffinose to adjust the pH thereof to about 5.2 followed by adding a $\frac{1}{10}$ M phosphate buffer (pH 5.2) and adjusting the resulting solution to 20° Brix with water.

Mycelium was then added to the diluted beet molasses solution so prepared, and an enzymatic reaction was carried out at 50° C. for 24 hours with shaking. The reaction mixture was filtered, and the residual raffinose and increased sucrose were determined in the filtrate by paper chromatography. With an added mycelium of 450,000 units of enzyme activity, 70.4% of the original raffinose were decomposed and 364 mg. sucrose were formed. The corresponding values after the addition of 900,000 units of enzyme activity were 81.5% and 544 mg. respectively.

EXAMPLE 7

The mold of the invention was cultured under the same conditions as in Example 6, and a fixed amount of the thus obtained mycelium was used as an enzyme source.

Sulfuric acid and a phosphate buffer (pH 5.2) were added to 10 g. of the afore-mentioned beet molasses, and the mixture was adjusted to 36° Brix with water. The diluted beet molasses solution was mixed with 1,700,000 units of enzyme and shaken at 37° C. for 24 hours. The reaction mixture was then filtered, and the decomposition or reffinose and the formed sucrose were determined. The cycelium filtered off was washed thoroughly with water and used again on another batch of the same diluted beet molasses solution, and this procedure was repeated once more. The results obtained in the three consecutive runs are shown in Table 5.

TABLE 5

| After run No.— | Increase in sucrose (mg.) | Decomposition of raffinose (percent) | Remaining α-G activity (percent) |
|---|---|---|---|
| 1 | 372 | 67.3 | 98 |
| 2 | 426 | 72.7 | 84 |
| 3 | 390 | 67.3 | 55 |

EXAMPLE 8

The mold of the invention was cultured as in Example 6, and the mycelium harvested was homogenized in a homogenizer and thereafter disrupted by means of an ultrasonic generator (10 kilocycle) for 1 hour. The disrupted mycelium was centrifuged to separate a supernatant from a precipitated fraction, and the activity of α-G was measured in each fraction. The enzyme activity was found to be 39% in the supernatant and 61% in the precipitated fraction. Raffinose in beet sugar molasses was decomposed by means of 1,750,000 units of the precipitated fraction in three consecutive runs as in Example 7. The results obtained were as shown in Table 6.

TABLE 6

| After run No.— | Increase in sucrose (mg.) | Decomposition of raffinose (percent) | Remaining α-G activity (percent) |
|---|---|---|---|
| 1 | 362 | 67.3 | 61 |
| 2 | 244 | 65.4 | 44 |
| 3 | 244 | 50.9 | 29 |

Raffinose was also decomposed by concentrating the above supernatant in a vacuum, adding 1,750,000 units of α-G in the form of the concentrate to 10 g. of beet molasses containing 1.088 g. raffinose, adjusting the resulting mixture to pH 5.2 and 36° Brix with water and sulfuric acid, and allowing it to stand at 37° C. for 24 hours. It was found that the decomposition rate of raffinose was 65.3% and the increased amount of sucrose was 260 mg.

EXAMPLE 9

A medium containing 1.5% lactose, 0.5% glucose, 1% corn steep liquor, 0.1% urea, 0.1% ammonium sulfate, 0.3% $KH_2PO_4$, 0.2% $MgSO_4 \cdot 7H_2O$ and 0.2% NaCl was inoculated with spores of the mold of the invention and cultured at 30° C. for 72 hours. The mycelium harvested from ml. of the medium were found to contain 28,000 units α-G.

10 g. batches of beet molasses containing 1.088 g. raffinose were diluted with water to 15° Brix, adjusted to pH 5.2 by adding sulfuric acid, and mixed with mycelium having 980,000 units of α-G activity. The mixtures were kept at 20° C., 30° C., 40° C., 50° C., 60° C. and 70° C., respectively, for 24 hours with shaking, whereupon the decomposition of the raffinose was measured. The results obtained are shown in Table 7.

TABLE 7

| Reaction temperature (° C.): | Decomposition of raffinose (percent) |
|---|---|
| 20 | 42.1 |
| 30 | 78.2 |
| 40 | 80.1 |
| 50 | 83.5 |
| 60 | 78.0 |
| 70 | 53.9 |

10 g. bathes of the same beet molasses were also diluted with a McIlvaine buffer to 15° Brix, their pH was adjusted to 2.2, 3, 4, 5, 6, 7 and 8, respectively, whereupon 980,000 units of mycelium were added, and the resulting solution was shaken at 50° C. for 6 hours. The measured decomposition of raffinose is shown in Table 8.

TABLE 8

| pH of reaction liquid: | Decomposition of raffinose (percent) |
|---|---|
| 2.2 | 11.0 |
| 3 | 61.2 |
| 4 | 80.5 |
| 5 | 80.7 |
| 6 | 51.9 |
| 7 | 38.1 |
| 8 | 12.0 |

EXAMPLE 10

A 10 g. bath of the same beet molasses as in the preceding examples was diluted with water to 15° Brix, adjusted to pH 5.2 with sulfuric acid, and mixed with 980,000 units of the same mycelium as in Example 9. The mixture was held at 50° C. for 6 hours with shaking. The recovered mycelium was thoroughly washed with water, added to another batch of diluted beet molasses, and the procedure was repeated once more. The results obtained in the three consecutive runs are shown in Table 9.

TABLE 9

| After run No.— | Decomposition of raffinose (percent) | Remaining α-G activity in mycelium (percent) |
|---|---|---|
| 1 | 77.3 | 79.4 |
| 2 | 74.6 | 66.6 |
| 3 | 65.3 | 58.3 |

Closely analogous results were obtained when diluted molasses was replaced by beet juice as extracted from the beets or after conventional refining steps.

While the invention has been described with particular reference to specific embodiments, it should be understood that it is not limited thereto but is to be construed broadly, and limited solely by the scope of the appended claims.

What is claimed is:

1. A method of reducing the raffinose content of sugar beet juice or beet molasses which comprises culturing the mold Mortierella vinacea var. raffinoseutilizer (ATCC No. 20034) requiring galactose or oligosaccharide having an α- or β-galactoside bond for forming α-galactosidase in the mycelium thereof on a medium containing said galactose or oligosaccharide having the galactoside bond; adding mycelial matter of the cultured mold or α-galactosidase prepared from the mycelium matter to said juice or molasses; and keeping the resulting mixture under conditions of enzymatic activity for said α-galactosidase until a portion of said raffinose is decomposed.

2. A method as set forth in claim 1, wherein said mixture is kept at 20° to 70° C. and a pH value of 3 to 7.

References Cited

FOREIGN PATENTS 7,429    4/1966    Japan.

OTHER REFERENCES

Suzuki et al.: Chemical abstracts, vol. 63, No. 15504f, 1965.

Report of the Commission on Enzymes of the International Union of Biochemistry, 1961.

A. LOUIS MONACELL, Primary Examiner

G. M. NATH, Assistant Examiner

U.S. Cl. X.R.

195—31